United States Patent

[11] 3,607,048

| | | |
|---|---|---|
| [72] | Inventor | Heinz Karwat<br>Pullach, Germany |
| [21] | Appl. No. | 698,907 |
| [22] | Filed | Jan. 18, 1968 |
| [45] | Patented | Sept. 21, 1971 |
| [73] | Assignee | Linde Aktiengesellschaft<br>Hoellriegelskreuth, Germany |
| [32] | Priority | Jan. 30, 1967 |
| [33] | | Germany |
| [31] | | L 55620 IVa/12k |

[54] REGENERATION OF LIQUIDS USED TO ABSORB CARBON DIOXIDE FROM GASES INTENDED FOR THE PRODUCTION OF AMMONIA SYNTHESIS GAS
6 Claims, 1 Drawing Fig.

[52] U.S. Cl. .................................................. 23/199,
23/2, 23/262, 55/68
[51] Int. Cl. .................................................. C01c 1/04,
C01b 2/30, B01d 19/00

[50] Field of Search .................................................. 23/199,
198, 2; 55/68

[56] References Cited
UNITED STATES PATENTS

| | | | |
|---|---|---|---|
| 2,610,106 | 9/1952 | Gray.................................. | 23/199 |
| 2,649,166 | 8/1953 | Porter et al. .................. | 55/68 |
| 3,343,916 | 9/1967 | Cahn et al.................... | 23/199 |

Primary Examiner—Oscar R. Vertiz
Assistant Examiner—Hoke S. Miller
Attorney—I. William Millen

ABSTRACT: In the production of ammonia from synthesis gas which has had its $CO_2$ absorbed by cold liquid, e.g. by cold methanol, the improvement of regenerating $CO_2$-loaded liquid with purged (waste) gas from the ammonia synthesis cycle, said purged gas being conventionally withdrawn to maintain a low level of inert gases in the recycle synthesis gas.

PATENTED SEP 21 1971 3,607,048
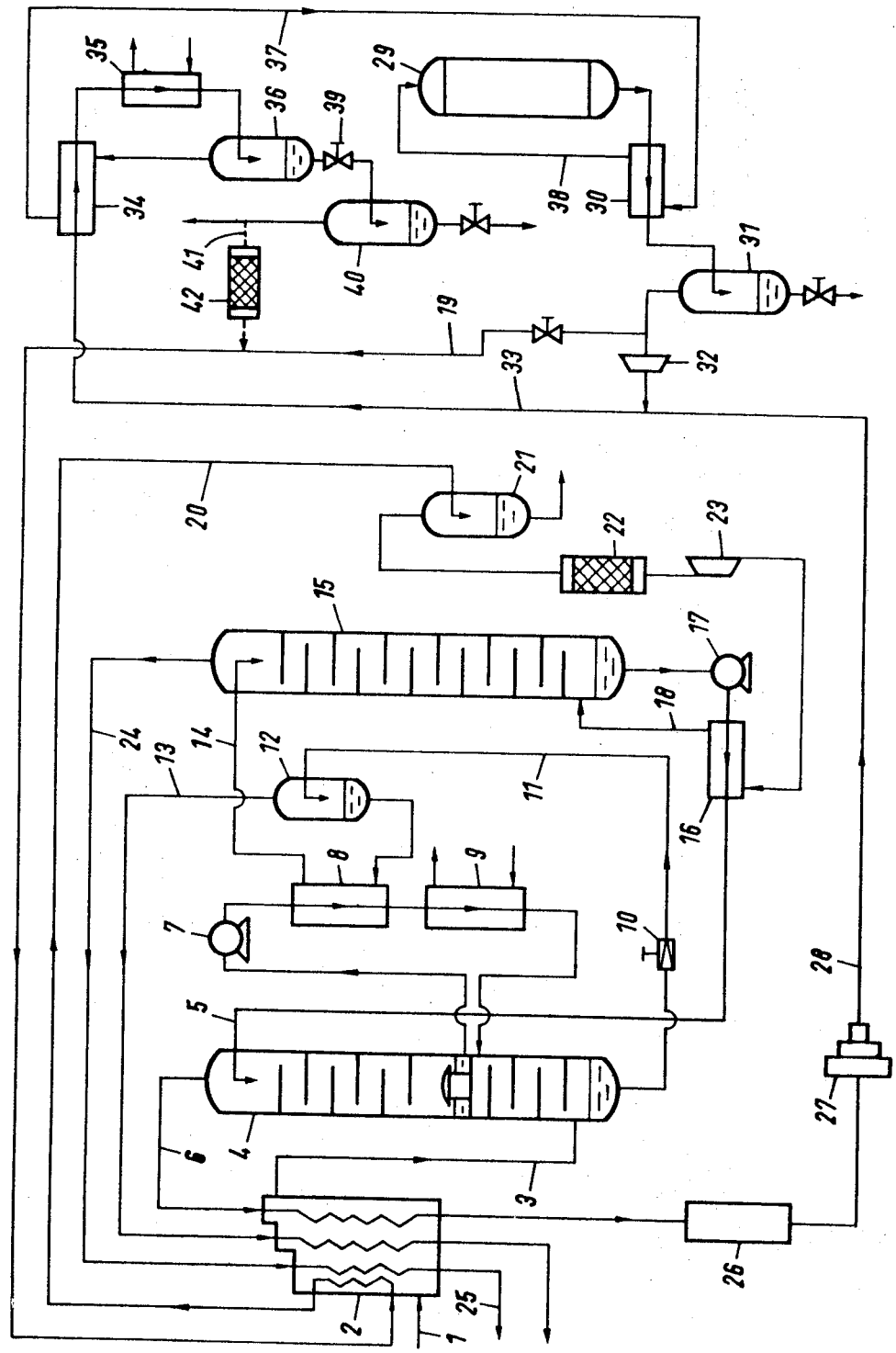
INVENTOR
HEINZ KARWAT
BY J. William Miller
ATTORNEY 3,607,048

REGENERATION OF LIQUIDS USED TO ABSORB CARBON DIOXIDE FROM GASES INTENDED FOR THE PRODUCTION OF AMMONIA SYNTHESIS GAS

BACKGROUND OF THE INVENTION

This invention relates to the regeneration of loaded scrubbing liquors obtained from the low-temperature absorption of $CO_2$ from gaseous mixtures intended for the production of ammonia synthesis gas.

For the removal of carbon dioxide from hydrogen containing gaseous mixtures produced, for example, by reacting methane or higher hydrocarbons with steam and subsequent conversion, there are a number of different types of scrubbing processes, differing with respect to the obtainable final $CO_2$ contents. In this class belong the so-called chemical scrubbing processes based on sodium or potassium carbonate solutions, with or without the addition of, for example, $As^{3+}$ salts, and physical scrubbing processes (pressurized water wash, methanol wash, etc.).

Especially low contents of carbon dioxide in the purified gas, with comparably very low-energy requirements (electrical and thermal) are obtained when employing a methanol washing step (German Pat. No. 731,660). Such a methanol scrubbing process is conducted at elevated pressure and at temperatures down to $-80°$ C.

The regeneration of the $CO_2$-loaded methanol was previously conducted by heating or boiling the methanol, involving a relatively high expenditure for regeneration in these plants. In a later development, the regeneration of loaded methanol was conducted rather at the temperature of the preceding scrubbing step by lowering the pressure and by stripping with a cold auxiliary gas (German Pat. No. 843,545). If $NH_3$ synthesis gas is highly purified by a nitrogen scrubbing process, then the $CO-N_2$ fraction present in the sump of the scrubbing column can be employed as the stripping gas after it has been evaporated ("Linde Berichte aus Technik und Wissenschaft" [Linde—Reports from Technology and Science], 1964, Vol. 17, pp. 15 et seq.).

However, if the more modern and more popular procedure is used for the production of $NH_3$ synthesis gas, namely, the reaction of hydrocarbons with steam, with the addition of the required synthesis nitrogen in the form of air in a secondary reformer; conversion; $CO_2$ removal; and methanation of the residual $CO+CO_2$, then the fine-purification by a nitrogen scrubbing step is eliminated, leaving no inexpensive and cold stripping gas. Although, in principle, cold nitrogen from an air fractionation plant would also be suitable as the stripping gas, such a plant is economically unjustifiable if used solely for that purpose.

SUMMARY OF THE INVENTION

It is an object of the present invention to provide an economical process for conducting the regeneration of the loaded scrubbing medium at about the temperature of the scrubbing step by using a stripping gas.

Another object is to provide apparatus for this process.

Upon further study of the specification and claims, other objects and advantages of the present invention will become apparent.

These objects are attained in accordance with this invention by employing as the stripping gas the waste purged gas from the ammonia synthesis.

The attached drawing is a schematic flowsheet of a comprehensive preferred embodiment of this invention.
DETAILED DISCUSSION OF THE INVENTION During the ammonia synthesis, an amount of 8–14 percent of the processed synthesis gas must be continuously purged from the cycle gas leaving the contact furnaces, in order to eliminate the inert components (rare gases, methane) which would otherwise accumulate in the cycle. The purged gas, after removal of the $NH_3$ contained therein, is conventionally employed as fuel for heating the contact furnaces. This gas, containing as the main components about 69 percent by volume of $H_2$, 23 percent by volume of $N_2$, 3 percent by volume of Ar, and 5 percent by volume of $CH_4$, has been discovered to have all the properties expected for a suitable stripping gas. It is available practically dry and under pressure and reacts neither with the scrubbing agent nor with the gas to be scrubbed. Besides, it has hardly any solubility in the scrubbing agent and is free of $CO_2$, the latter feature being of special importance for the stripping of $CO_2$-loaded scrubbing agent solutions.

Furthermore, since the $CO_2$ scrubbing step is conducted in most cases at 20–30 atmospheres absolute or above, and the regeneration of the scrubbing agent is carried out at about 1 atmosphere absolute, the volume of the gas branched off from the synthesis gas cycle as the stripping gas is usually sufficient. As still another aspect of this invention, there is the further advantage that the expansion of the synthesis waste gas down to the regenerating pressure can be utilized for the generation of refrigeration.

Therefore, in accordance with this invention, the portion of the synthesis waste gas branched off from the cycle and intended for stripping purposes is first cooled and then conventionally freed of ammonia, for example, by condensing the ammonia or by a washing step. Subsequently, the proportion of ammonia which cannot be removed by these means is removed by an absorbent. Then, the $NH_3$-free synthesis waste gas is subjected to an engine expansion in a turbine, the thus-produced refrigeration being transferred to regenerated scrubbing solution which is thereafter introduced in the cold state to the head of a scrubbing column.

According to a preferred feature of this invention, the cold $CO_2$-enriched stripping gas from the regenerating column is brought into heat exchange with unscrubbed crude gas, which is thus precooled to almost the scrubbing temperature.

In accordance with another preferred feature, it is also possible to recover the hydrogen contained in the synthesis waste gas to a substantial degree, recycle this hydrogen to the ammonia synthesis gas, and employ as stripping gas only the remainder of the synthesis waste gas. Recovery of the hydrogen is described in "The Chemical Engineer," Apr. 1965, pages CE 87–90.

The volume of stripping gas necessary for regeneration is given by the equation:

$S = W \cdot \lambda_i \cdot P$, wherein S = volume of stripping gas

W = amount of washing agent $\lambda_i$ = technical coefficient of solubility of dissolved component at partial pressure $p_i$ P = regeneration pressure.

In order to get (in spite of the small quantity of gas) a sufficient volume of gas during the subsequent engine expansion of the stripping gas, it is possible for it to become necessary to expand the gas to a pressure of below 1 atm. abs. and to conduct the regeneration of the scrubbing solution at subatmospheric pressures such as 0.1 to 0.8 atmosphere absolute.

This low pressure, however, brings with it the advantage of excellent regeneration.

If the gas continuously branched off from the cycle gas should be available, after the ammonia has been separated, is clearly insufficient for the regeneration of the scrubbing agent, then according to a further preferred aspect of this invention, it is possible to add to such purged gas inert components separated from the ammonia product.

The applicability of the present invention is not limited to methanol as the scrubbing agent. Other conventional scrubbing agents utilizable for the purification of ammonia synthesis gas, such as, for example, acetone, gasoline, tetralin, solvent naphtha, toluene, xylene, etc. can also be treated for purposes of regeneration in accordance with this invention.

DETAILED DESCRIPTION OF THE DRAWING

The invention will now be described with reference to the preferred comprehensive embodiment schematically illustrated in the drawing.

Prepurified conversion gas enters through conduit 1 under a pressure of 28 atmospheres absolute and with a $CO_2$ content of 31 percent into the heat exchanger 2 wherein it is cooled to a temperature of −35° C. counter-currently to scrubbed gas, expanded carbon dioxide, and $CO_2$-containing synthesis waste gas.

The cooled gas is introduced through conduit 3 into the lower section of the scrubbing column 4, with scrubbing solution being fed at the head thereof through conduit 5. The $CO_2$-free, scrubbed gas is withdrawn as overhead from the scrubbing column 4 through conduit 6.

The scrubbing solution, e.g. methanol, while passing down the column, becomes saturated with $CO_2$ and simultaneously absorbs the $CO_2$ heat of solution. The resultant warmed loaded liquid is removed from the sump of the upper section of column 4 by means of the pump 7, and much of the heat of solution is transferred in the heat exchanger 8 against expanded sump liquid from the lower section of the column. The cooled liquid is further cooled in the heat exchanger 9 against evaporating ammonia, whereupon the cold scrubbing liquor is then pumped to the under portion of the lower section of the column.

The $CO_2$-loaded scrubbing agent collecting in the sump of the bottom section of column 4 is expanded in a throttle 10, a portion of the dissolved $CO_2$ being vaporized thereby, and is fed via conduit 11 to a phase separator 12 from which almost pure carbon dioxide is withdrawn via conduit 13. The scrubbing agent, still containing a rather large quantity of $CO_2$, is then conducted from the separator 12 through the heat exchanger 8 via conduit 14 into the stripping column 15 for purposes of regeneration, this column operating at 1.2 atm. abs. The regenerated scrubbing agent is withdrawn from the foot of the stripping column 15, cooled to scrubbing temperature in heat exchanger 16, and recycled by pump 17 via conduit 5 to the head of the top section of the scrubbing column 4.

The regeneration of the loaded scrubbing agent in the regenerating column 15 is conducted by stripping with waste gas from the ammonia synthesis plant. This waste gas constitutes a purge stream customarily branched off in an amount of 8–14 percent from the cycle gas leaving the contact furnace in order to maintain a low concentration of inert gases in the cycle gas.

The waste gas consisting of $NH_3$, $H_2$, $N_2$, Ar and $CH_4$ is cooled in the heat exchanger 2 to below the dew point of the ammonia and is supplied via conduit 20 to a separator 21 wherein liquid ammonia is separated, and to remove the last traces of ammonia, the gas is passed through an adsorber 22. After being engine expanded in the expansion turbine 23 to 1.2 atm. abs., the expanded gas transfers its resultant refrigeration values in heat exchanger 16 to regenerated scrubbing agent. It is then introduced as stripping gas into column 15 through conduit 18. The resultant $CO_2$-containing stripping gas leaves the stripping column 15 through conduit 24, transfers additional refrigeration values in heat exchanger 2 to conversion gas and ammonia-containing synthesis waste gas. It can then be withdrawn through conduit 25 for further uses, for example, as fuel gas.

The scrubbed gas exiting from the head of the washing column 4 through conduit 6 is heated in heat exchanger 2, then conducted to a unit 26 for methanation of the carbon monoxide contained therein. It is thereafter compressed in compressor 27 to a pressure of 200–300 atm. abs., and introduced through conduit 28 into the synthesis gas cycle.

The synthesis gas cycle comprises the contact furnace 29, the heat exchanger 30, the separator 31, the compressor 32, the heat exchangers 34 and 35, and the separator 36. The synthesis cycle gas flowing off from the contact furnace 29 is first cooled in the heat exchanger 30 in order to condense part of the ammonia contained therein, this ammonia collecting in the separator 31 in the liquid phase. To obtain an additional amount of ammonia, the cycle gas is passed by blower 32 via conduit 33 under pressure through the heat exchangers 34 and 35. In these heat exchangers, the cycle gas is first cooled countercurrently with ammonia-depleted cycle gas and then with an external ammonia stream. From exchanger 35, it is supplied to the separator 36 wherein liquid ammonia is collected. The cycle gas, substantially free of ammonia is returned to the contact furnace via the heat exchanger 34, the conduit 37, the heat exchanger 30 and conduit 38. In the heat exchangers 34 and 30, the refrigeration values of the ammonia depleted gas are transferred to synthesis cycle gas.

The ammonia collecting in the separator 36 is not entirely pure. It still contains minor amounts of $H_2$, $N_2$ and inert gases, mainly argon and methane. In order to remove same completely, the liquid $NH_3$ from the separator 36 is expanded in a throttle 39 and fed to a separator 40, where pure product $NH_3$ is withdrawn at the bottom and a mixture of $H_2$, $N_2$ and inert substances is removed at the top.

If the gas flowing through conduit 19 is not in sufficient quantity to act as the stripping gas, it can have admixed thereto via conduit 41 a portion of the head gas from the separator 40 after such head gas is freed of traces of $NH_3$ in adsorber 42.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim

1. In a process for the production of ammonia by an ammonia synthesis cycle comprising:
   scrubbing $CO_2$-containing synthesis gas with liquid scrubbing solution at low temperatures to absorb $CO_2$;
   regenerating resultant loaded scrubbing solution under a pressure up to about 1 atmosphere absolute;
   reacting $CO_2$-free synthesis gas in a reactor to form ammonia;
   separating ammonia from unreacted synthesis gas;
   recycling unreacted synthesis gas to said reactor for further reaction; and
   prior to reaching the reactor, purging a minor quantity of said recycle gas from the cycle to maintain a low level of inert gases in the recycle gas;
   the improvement comprising completely freeing resultant purged recycle gas of ammonia, engine expanding said ammonia-free purged gas to the pressure of the regenerating step, and employing resultant expanded ammonia-free purged gas to strip $CO_2$ from said loaded scrubbing solution.

2. A process as defined by claim 1 wherein the purged gas constitutes 8–14 percent of the ammonia synthesis cycle gas.

3. A process as defined by claim 1 further comprising the step of supplementing the purged gas by adding thereto inert gases removed from liquid ammonia product.

4. A process as defined by claim 1 wherein the pressure of the regenerating step is below 1 atmosphere absolute.

5. A process as defined by claim 1 comprising a further step of removing hydrogen from the purge gas before said regenerating step.

6. A process as defined by claim 1 wherein said purged gas comprises on volume basis about 69 percent $H_2$, 23 percent $N_2$, 3 percent Ar, and 5 percent $CH_4$.